United States Patent
Aslan et al.

(10) Patent No.: US 6,808,307 B1
(45) Date of Patent: Oct. 26, 2004

(54) TIME-INTERLEAVED SAMPLING OF VOLTAGES FOR IMPROVING ACCURACY OF TEMPERATURE REMOTE SENSORS

(75) Inventors: Mehmet Aslan, Milpitas, CA (US); Richard Dean Henderson, Sunnyvale, CA (US); Michael Wong, Santa Clara, CA (US); Qing Feng Ren, San Jose, CA (US); Chungwai Benedict Ng, Mountain View, CA (US); Hideya Oshima, Santa Clara, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/051,332

(22) Filed: Jan. 16, 2002

Related U.S. Application Data

(60) Provisional application No. 60/325,700, filed on Sep. 27, 2001.

(51) Int. Cl.⁷ .............................................. G01K 7/01
(52) U.S. Cl. .................................................. 374/178
(58) Field of Search ........................ 374/102, 120, 374/178, 183; 327/512, 100, 103; 257/467, 468, 469, 470; 324/766

(56) References Cited

U.S. PATENT DOCUMENTS

| | | | | |
|---|---|---|---|---|
| 5,453,682 A | * | 9/1995 | Hinrichs et al. ............ | 324/132 |
| 5,639,163 A | * | 6/1997 | Davidson et al. ........... | 374/178 |
| 5,982,221 A | * | 11/1999 | Tuthill ....................... | 327/512 |
| 6,097,239 A | * | 8/2000 | Miranda et al. ............ | 327/512 |
| 6,149,299 A | | 11/2000 | Aslan et al. ................ | 374/178 |
| 6,332,710 B1 | | 12/2001 | Aslan et al. ................ | 374/183 |
| 6,637,934 B1 | * | 10/2003 | Henderson et al. ......... | 374/178 |
| 2002/0101906 A1 | * | 8/2002 | Braun et al. ............... | 374/178 |

OTHER PUBLICATIONS

"8–Lead, Low–Cost, System Temperature Monitor ADM1020," Analog Devices, Inc., 1999, pp. 5–6.
"Low–Cost Microprocessor System Temperature Monitor ADM1021A," Analog Devices, Inc., 2001, pp. 5–7.
"System Monitor and Fan Controller For Low–Noise PCs ADM1027," Analog Devices, Inc., 2001, pp. 14–17.

(List continued on next page.)

*Primary Examiner*—Diego Gutierrez
*Assistant Examiner*—Mirellys Jagan
(74) *Attorney, Agent, or Firm*—Mark R. Hennings; Merchant & Gould

(57) ABSTRACT

A method and apparatus improves the accuracy of temperature measurements by sampling measurements from a remote sensor, where currents of different current densities are applied to the remote sensor in a time-interleaved fashion. The remote sensor includes at least one PN junction that produces a voltage corresponding to the applied current at each instance of time, and related to the temperature of the remote sensor. By applying time-interleaved current densities to the remote sensor, adverse effects from temperature variations during the measurement are minimized. Sequences of current biases having differing current densities in a forward order are applied to the remote sensor, followed by the same sequence being applied to the remote sensor in a reverse order. Similarly, a random or pseudo-random sequence may be employed in a forward and reverse order. The application of forward and reverse sequences is utilized to minimize errors in the temperature measurement.

22 Claims, 8 Drawing Sheets

OTHER PUBLICATIONS

"±1°C Remote and Local System Temperature Monitor ADM1032," Analog Devices, Inc., 2001, p. 5.

"Remote/Local Temperature Sensor with SMBus Serial Interface MAX1617," Maxim Integrated Products, Rev 1; 3/98, pp. 6–9.

"Remote/Local Temperature Sensor with SMBus Serial Interface MAX1617A," Maxim Integrated Products, Rev 0; 1/99, pp. 6–9.

"MIC184 Local/Remote Thermal Supervisor," Micrel, Inc., Nov. 2000, pp. 6–7.

"LM83 Triple–Diode Input and Local Digital Temperature Sensor with Two–Wire Interface," National Semiconductor Corporation, Nov., 1999, pp. 8 and 17.

"LM84 Diode Input Digital Temperature Sensor with Two–Wire Interface," National Semiconductor Corporation, Jul. 2000, pp. 9–10, 14–15.

"LM88 Factory Programmable Dual Remote–Diode Thermostat," National Semiconductor Corporation, Aug. 2001, 9 pgs.

"LM87 Serial Interface System Hardware Monitor with Remote Diode Temperature Sensing," National Semiconductor Corporation, Nov. 2001, pp. 8, 17–18.

"LM86 ±1°C Accurate, Remote Diode and Local Digital Temperature Sensor with Two–Wire Interface," National Semiconductor Corporation, Feb. 2002, pp. 7, 11–12, 17–19.

"LM90 ±3°C Accurate, Remote Diode and Local Digital Temperature Sensor with Two–Wire Interface," National Semiconductor Corporation, Feb. 2002, pp. 7, 11–12, 17–19.

"NE1617A Temperature Monitor for Microprocessor Systems," Philips Semiconductors, Dec. 14, 2001, p. 9.

"Environmental Monitoring and Control Device with Automatic Fan Capability EMC6D100, EMC6D101," Standard Microsystems Corporation, Rev. Nov. 19, 2001, pp. 22–23.

"THMC50 Remote/Local Temperature Monitor and Fan Controller with SMBus Interface," Texas Instruments Incorporated, 1999, pp. 2, 17–18.

"THMC10 Remote/Local Temperature Monitor with SMBus Interface," Texas Instruments Incorporated, 1999, pp. 13–14.

A. Bakker and J.H. Huijsing, "High Accuracy CMOS Smart Temperature Sensors," *Kluwer Academic Publishers*, pp. 9–34, 74–77, 106–116, 2000.

* cited by examiner

US 6,808,307 B1

TIME-INTERLEAVED SAMPLING OF VOLTAGES FOR IMPROVING ACCURACY OF TEMPERATURE REMOTE SENSORS

RELATED APPLICATION

This utility patent application claims the benefit under 35 United States Code §119(e) of U.S. Provisional Patent Application No. 60/325,700 filed on Sep. 27, 2001.

BACKGROUND OF THE INVENTION

The present invention relates to a method and apparatus for electronic temperature sensing and recording devices. More specifically, the present invention is directed to improving the accuracy of temperature measurements made during temperature changes by interleaving bias currents of a forward-biased PN junction in a remote temperature remote sensor ("remote sensor"). Temperature measurements are made by applying two different currents to the PN junction and measuring the resulting potential across the PN junction. Temperature calculations are made by determining the difference (" $\Delta V_{for}$ ") between the measured voltages for each applied current.

SUMMARY OF THE INVENTION

The present invention is directed to a method and apparatus that improves temperature measurements made with a remote sensor. More specifically the present invention is directed towards a method and apparatus that improves the accuracy of temperature measurements that are made during temperature changes by interleaving bias currents of a forward-biased PN junction in a remote sensor.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

The present invention is directed to a method and apparatus that improves the accuracy of measurements from a remote sensor. In one example, a data-acquisition system is used to monitor the temperature of a remote sensor in a remote system by measuring the changes in voltages across a PN junction in the remote sensor that occur due to changes in temperature of the PN junction.

Figure 1:
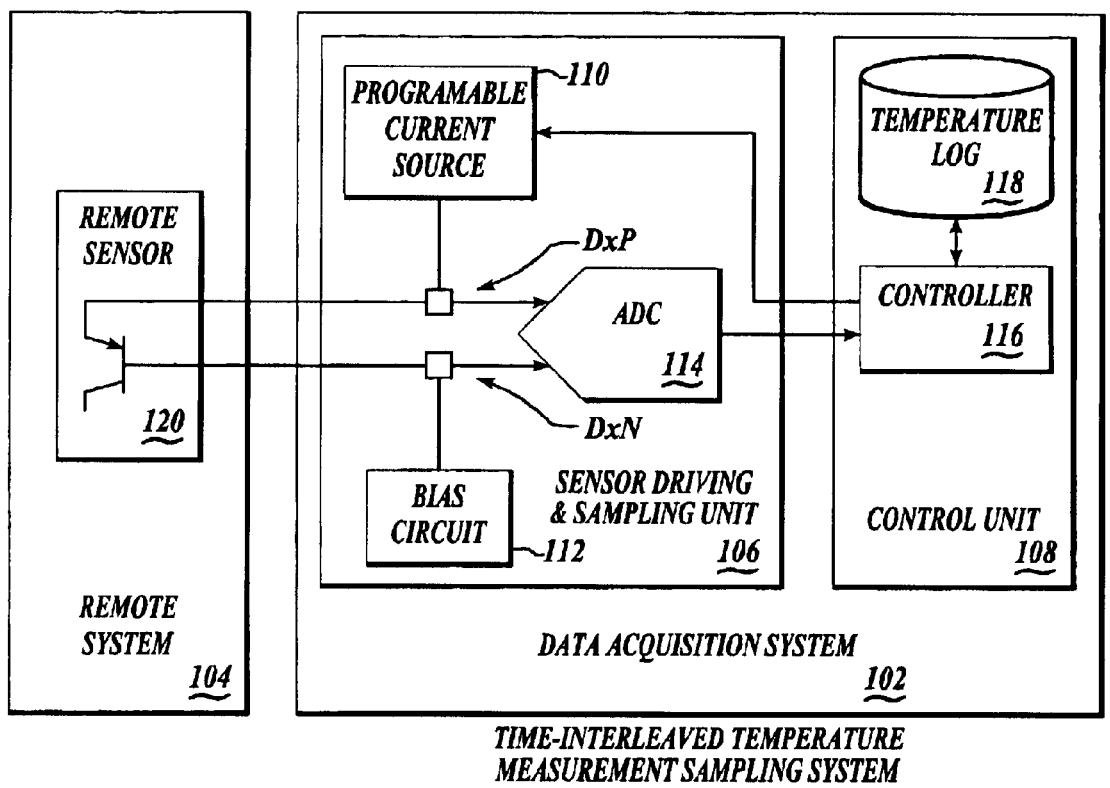
FIG. 1 is a schematic block diagram of an example time-interleaved sampling temperature measurement system in accordance with the present invention.

FIG. 1 is a schematic block diagram of an example time-interleaved sampling temperature measurement system in accordance with the present invention. The time-interleaved sampling temperature measurement system (100) includes a data acquisition system (102) and a remote system (104). The remote system (104) may be located in the same substrate, or a different substrate, as the substrate containing the data acquisition system (102). The data acquisition system (102) includes a sensor driving and sampling unit (106) and a control unit (108). The sensor driving and sampling unit (106) includes a programmable current source (110), a bias circuit (112), and an analog-to-digital converter (ADC, 114). The control unit (108) includes a controller (116) and an optional temperature log (118). The remote system (104) includes a remote sensor (120).

The remote sensor (120) is illustrated as a PNP transistor that has an emitter that is coupled to a node DxP and a base that is coupled to a node DxN. The a programmable current source (110) includes an output that is coupled to the node DxP and an input that is coupled to the controller (116). The ADC (114) includes a differential input that is coupled to the node DxP and the node DxN, and an output that is coupled to an input of the controller (116). The controller (116) is also coupled to the optional temperature log (118).

Temperature measurements of a PN junction in the remote sensor (120) are measured by applying currents, measuring resulting voltages, and calculating a temperature based on the resulting voltages. The programmable current source (110) provides two currents to the PN junction. The currents are applied so that the PN junction in the remote sensor (120) is forward-biased. The resulting voltages across the PN junction from each applied current is sampled with the ADC (114). In an alternate embodiment, the voltage across the PN junction in the remote sensor (120) maybe oversampled (such that many samples are taken for a selected bias current). In various embodiments, the ADC (114) may be implemented by a converter such that the values produced by the converter may be processed within an analog environment, a digital environment, or a mixed-signal environment. The samples may be averaged to reduce the effects of noise and to enhance the accuracy of calculations using values derived by the analog-to-digital conversions. Samples are typically made at regular intervals such that each sample is separated from other samples by substantially equal time differences. Substantially equal time differences are within 90 per cent of a desired value.

Temperature calculations can be determined according to the following formula:

$$T = \frac{q\Delta V_{for}}{\eta K \ln(N)}, \quad (I)$$

where it
T=absolute temperature in degrees Kelvin;
q=the charge on the carrier (electron charge);
$\Delta V_{for}$=change in the forward-biased voltage;
K=Boltzmann's constant;
N=ratio of the two applied currents; and
η=ideality factor of the diode.

The ratio (N) can be realized as a combination of area ratios of the PN junctions using a common current, a ratio of currents across two PN junctions that have the same area, or a combination thereof In the case where the PN junctions have the same area, the change in the forward-biased diode voltage ($\Delta V_{for}$) can be determined by subtracting the measured voltages that resulted by applying two different currents. The two PN junctions ideally should have the same PN junction temperature despite the fact that they cannot exist in the exact same physical location.

Similarly, a single PN junction (including "stacked diodes" and PN junctions in parallel) can be used to determine the ratio (N) by successively applying two different currents to the single PN junction. Using a single PN junction also reduces the area required for implementing the circuitry. However, the temperature of the PN junction may vary between the successive voltage measurements from the two different applied currents. Errors in the value of the calculated temperature may result from variations in temperature between successive measurements of the forward-biased voltage. Errors are more likely to occur when the PN junction is in a remote system where the PN junction is not affected by the thermal mass of a package containing the data acquisition system (102). Without sufficient thermal mass, the temperature of the PN junction can change rapidly with respect to the sampling rate of the remote sensor (120). Keeping the time between applications of the successive currents relatively small can reduce the magnitude of errors due to temperature drift of the PN junction.

The present invention diminishes the effects of variances in the temperature of the PN junction-based remote sensor (120) by using time-interleaved sampling of voltages across the PN junction. An example embodiment of the time-interleaved sampling temperature measurement system divides the time in which measurements for a temperature calculation are made into two phases. In a first phase, forward-biased voltages of the remote sensor (120) are sampled using at least two different bias currents. The bias currents used to perform the voltage measurements in the first phase are ordered within a first set of bias currents. A second set of bias currents having the currents ordered in a reverse order (relative to the first set) is used for sampling forward-biased voltages of the remote sensor (120) in the second phase.

Figure 2:
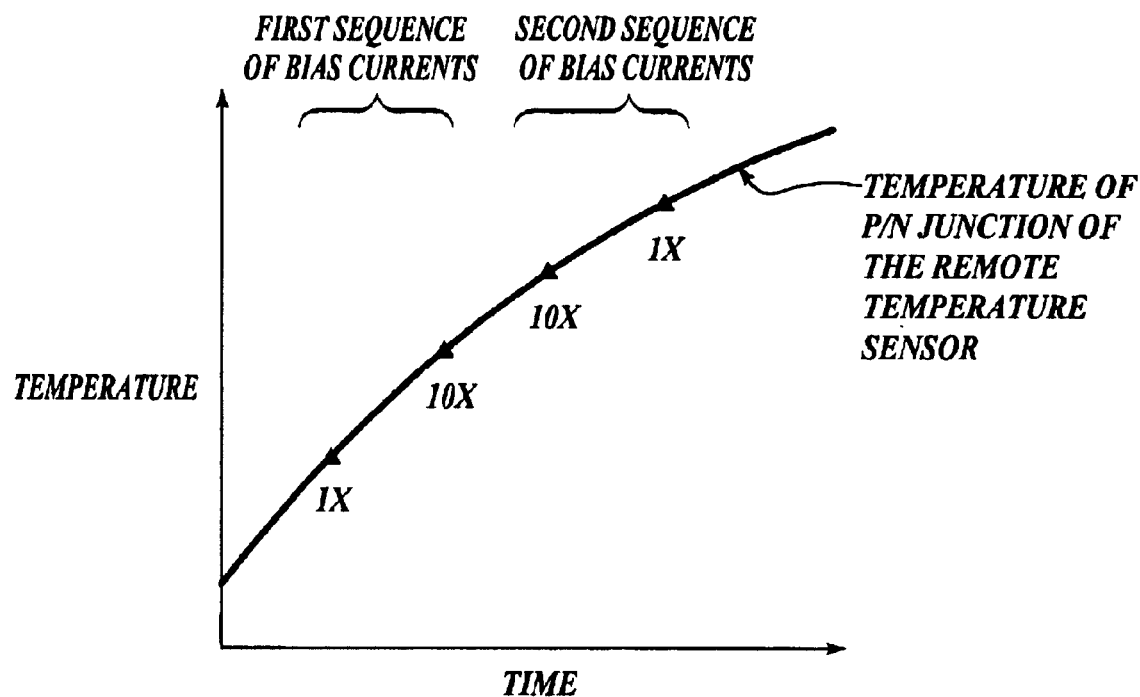
FIG. 2 is a graph illustrating various bias currents being used to measure a rising temperature in accordance with the present invention.

FIG. 2 is a graph illustrating various bias currents that are used to measure a rising temperature in accordance with the present invention. As shown in FIG. 2, the first set of bias currents may comprise the currents "1×" and "10×," while the second set of bias currents may comprise the currents "10×" and "1×." Using these example sets of currents, the "1×" current and the "10×" current are applied in turn during the first phase while voltage measurements are taken for each current. During the second phase, the "10×" and "1×" currents are applied in turn with voltage measurements being taken for each current. Thus, a pattern of "1× 10× 10× 1×" of bias currents is applied. The pattern has a midpoint that is equidistant in time from when the first and the last elements in the pattern. The pattern of "1× 10× 10× 1×" can be repeated, for example, 10 times while using a different current source for the "1×" current in each pattern. (See, FIG. 4 below.) For example, the 10× current can be derived from 10 individual current sources, wherein each individual current source supplies one-tenth of the 10× current.

Using each of the different individual current sources for the 1× element in a series of repeated patterns allows averaging of measurements that were made from different individual current sources. Averaging such measurements increases the accuracy of the temperature calculations. In one embodiment, each individual current source (e.g., a 1× current source) is used to collectively produce the larger value (e.g., a 10× current value). During each repeated pattern, a different individual current source is applied as the smaller value (e.g., a 1× current value). Using each of the individual current sources for the smaller current value allows the errors produced by variations of the individual current sources to be minimized through averaging.

As discussed above, a measurement error will occur when calculating the temperature if the temperature has changed between measurements of the forward biased PN junction voltage corresponding to the "1×" and the "10×" current. In practice, temperature changes typically do not have both a large change in temperature and direction relative to the remote sensor (120) sampling rate. When the second set of currents is in a reverse order, the errors that result from applying the second set of currents will tend to cancel the errors resulting from applying the first set of currents. As such, the errors from each set of currents will offset one another, such that the accuracy of the temperature calculation is improved.

The measurements obtained from applying both sets of bias currents are mathmatically combined to produce a numerical quantifier that describes the temperature of the remote sensor (120). In an example embodiment, the final temperature may be quantified by obtaining a numerical average of the remote sensor (120) samples for each set of applied currents. A more accurate temperature calculation is achieved by averaging remote sensor (120) voltages from both sets of currents where errors resulting from a changing temperature will tend to cancel out.

Where the second set contains the elements of the first set in reverse order, the last member of the first set and the first member of the second set are equal current levels. In other embodiments, the results of the voltage measurement for the last current of the first set may accordingly be used in place of the voltage measurement for the first current of the second set. In these embodiments, the step of applying the first current of the second step and the measuring the resulting voltage may be omitted. For example, where the first and second sets produce an ordered sequence of "10× 1× 1× 10×," the sequence may be modified to "10× 1× 10×."

Figure 3:
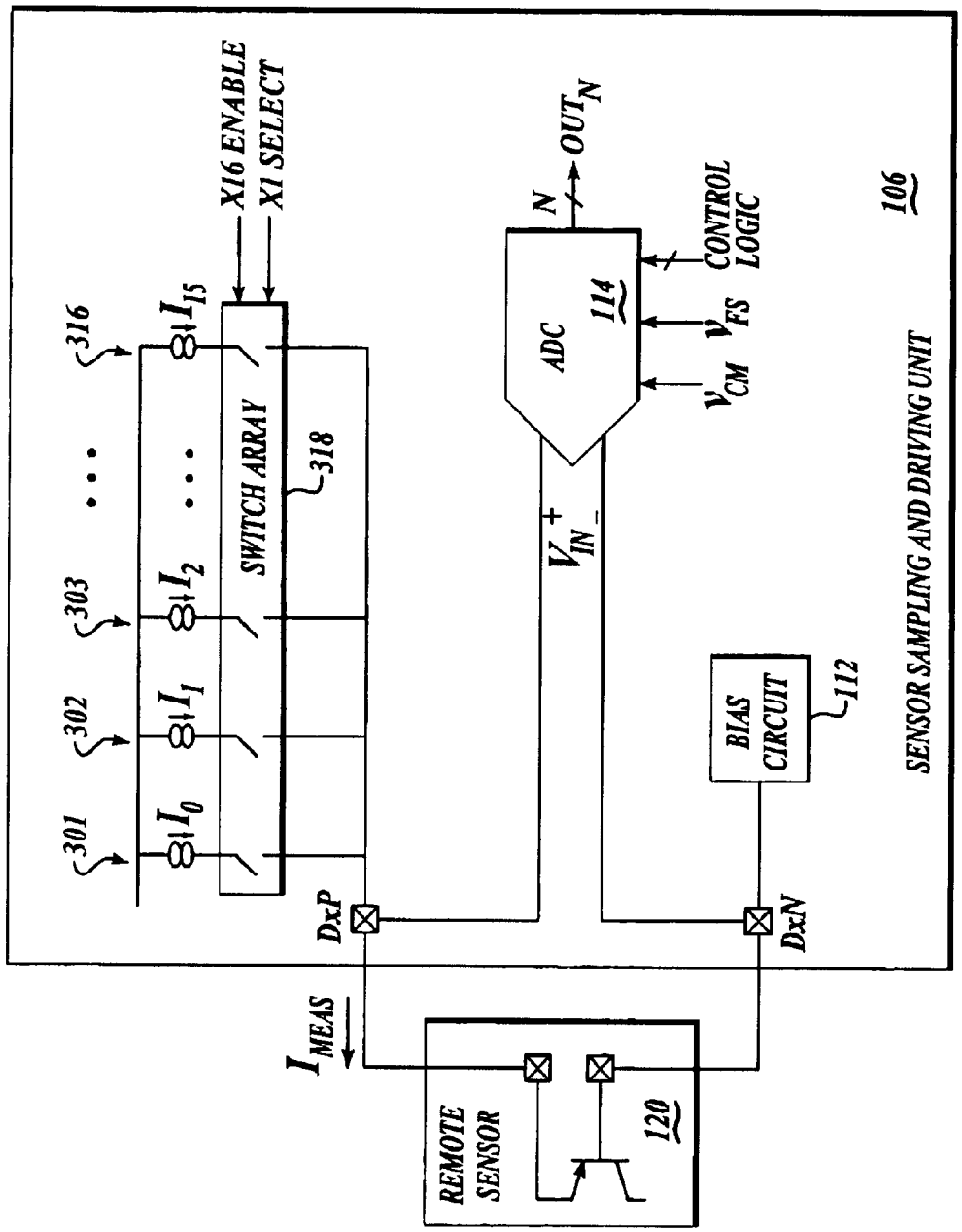
FIG. 3 is a schematic diagram of an example sensor driving and sampling unit in accordance with the present invention.

FIG. 3 is a schematic diagram of an example sensor driving and sampling unlit (106) that is in accordance with the present invention. The sensor driving and sampling unit (106) contains an array of 16 current sources (301–316), a switch array (318), an ADC (114), a bias circuit (112), and a remote sensor (120). Identical components from FIG. 2 are labeled and connected identically in FIG. 3. The discussion concerning the remote sensor (120) and the bias circuit (112) are identical to that which is discussed previously.

The switch array (318) is coupled between the output of the current sources (301–316) and the node D×P. Signal X16Enable and signal X1Select are coupled to the input of the switch array (318). The ADC (114) has an input that is coupled to the node DxP, the node DxN, a signal bus output OUTN, a common mode input signal $V_{CM}$, a full-scale input signal $V_{FS}$, and signal bus Control Logic input from the controller (not shown, 116). The bias circuit (112) is coupled to the node DxN.

The switch array (318) provides at least two levels of current by selectively coupling one or more current sources (301–316) to the node DxP. If the current sources (301–316) each provide equal current densities, the current ratio of 16 to 1 may be provided by switching on all 16 current sources (301–316) for one current level and by switching on only one current source (e.g., 301) for another current level. Also, individual current sources may be activated at different times such that a desired programmable current level may be realized by selectively activating different current sources. For example, each equally sized current source can be activated sequentially for remote sensor (120) measurements such that the same current density is provided from differing current sources. The current sources may be sized differently such that integer and noninteger current ratios of greater than one can be achieved.

In operation, the controller (116) uses the signals X16Enable and X1Select to program the switch array (318). The controller (116) may be implemented as a microprocessor, a microcontroller, hardwired logic, a state machine, and the like. Mathmatical functions provided by controller (116) may be implemented as algorithms embodied in software or firmware, implemented using physical devices, or implemented as a combination of both. For example, a function for averaging may be implemented as an average calculator. An average calculator uses an adder to find the sum of input digits and then uses a divider to divide the sum by the number of input digits.

The switch array (318) is selectively activated to provide a 1x current density or a 16x current density. Activating signal X1Select causes one of the current sources (at a 1x current density) to be applied to the remote sensor (120), while activating X16Enable causes all of the current sources (notwithstanding the state of the signal X1Select) to be applied to the remote sensor (120). The applied current and the voltage applied to the base of the remote sensor (120) by the bias circuit (112) cause a voltage to develop across the PN junction in the remote sensor (120). This voltage is dependent upon the temperature of the PN junction in the remote sensor (120).

The controller (116) initiates a voltage measurement of the remote sensor (120) by signaling the ADC (114) using the signal bus Control Logic. The ADC (114) may be implemented by any type of converter (e.g. flash, successive approximation, and the like) that is capable of performing an analog-to-to digital conversion within a required time interval. A low pass filter may be used at the input of the ADC (114) to reduce system noise. Undesirable noise may be induced upon the voltage from the PN junction in the remote sensor (120) by unstable power rails, inductive coupling, and the like. A sample and hold device may not be necessary at the input of the ADC (114) because the temperature (and the signal that conveys the temperature) typically will not vary rapidly with respect to the sampling rate. A wide range of implementations of the control logic will be suitable. The controller (116) retrieves the voltage measurement from the ADC (114) by reading the signal bus $OUT_N$. Signals $V_{CM}$ and signal $V_{FS}$ apply a common mode voltage and a full-scale voltage to the ADC (114).

Figure 4:
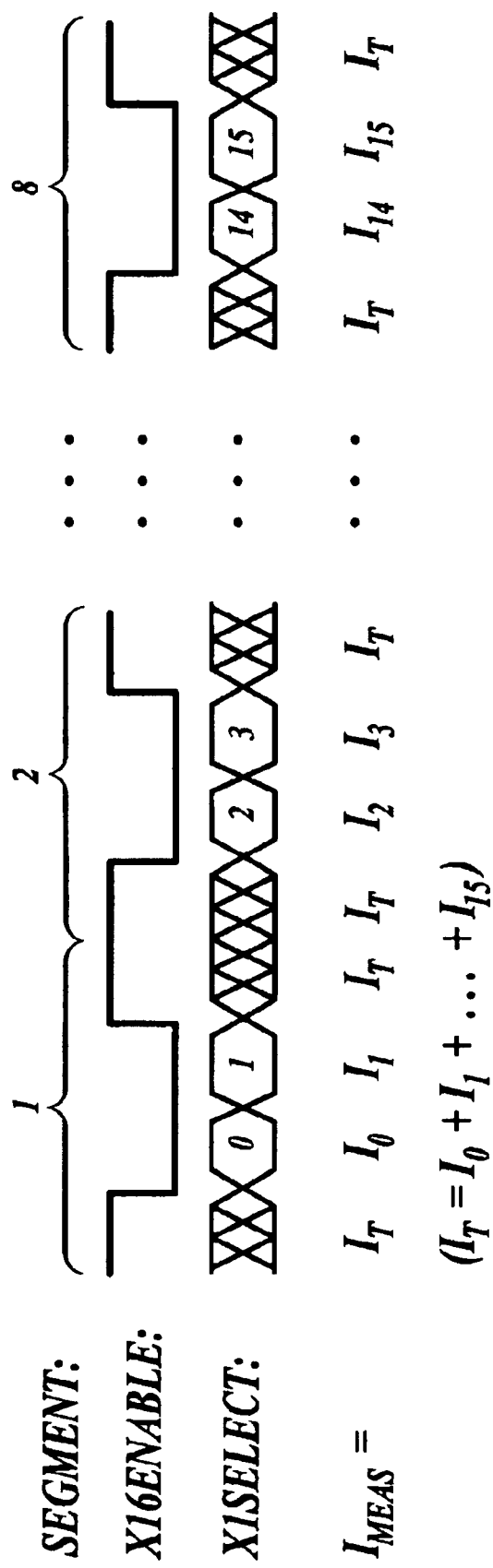
FIG. 4 is a graph illustrating the function of two control signals of an example embodiment for providing two different current densities in accordance with the present invention.

FIG. 4 is a graph illustrating the function of two control signals of an example embodiment for providing two different current densities in accordance with the present invention. The operation of the X16Enable and X1Select signals is shown over a period of eight segments of time. The X16Enable and X1Select signals are arranged to selectively control 16 individual current sources. For example, when X16Enable is high, a 16x current is applied to the remote sensor (120) by enabling all 16 current sources simultaneously (regardless of the state of X1Select). When X16Enable is low, the X1Select signal provides a 4-bit control number (or alternatively 16 control lines or other suitable encoding) that is used to activate a selected one of the 16 current sources such that a 1x bias current from the selected current source is provided to the remote sensor (120).

During each of the eight time segments illustrated in FIG. 4, a first sequence and a second sequence of current densities are applied to the remote sensor (120). During the first sequence of each segment the current densities 16x and 1x are applied in order to the remote sensor (120). During the second sequence the current densities 1x and 16x are respectively applied to the remote sensor (120). Alternatively, other patterns may be applied. For example, a first sequence may include the pattern "16x 1x 1x" and a second sequence may include the pattern "1x 1x 16x." Also, a random or pseudorandom pattern can be applied. A pseudorandom sequence contains an even distribution of currents of each density.

In the first time segment, the current density 16x is initially applied to the remote sensor (X16Enable is activated). The value of X1Select determines which of the current sources will be activated to supply a 1x current density when X16Enable transitions to an inactive state. For example, a value of "0" for X1Select is used to select the first current source ($I_0$). Thus, $I_{MEAS}$ (which is the current applied to the remote sensor) is equal to $I_T$ (which is the 16x current density) and $I_0$ (which is a 1x current density derived from the first current source) for the first sequence of the first time segment.

During the second half of each segment, the second sequence is applied. Here, X1Select corresponds to a value of "1" and the second current source ($I_1$) with a current density of 1x is selected. When X16Enable becomes active at the end of the segment, all current sources are activated again so that a current density of 16x is applied. Thus, $I_{MEAS}$ is equal to $I_1$ (which is a 1x current density derived from the second current source) and $I_T$ for the second sequence of the first segment. In this example, X1Select is incremented each time a 1x current density is applied so that all 16 current sources are individually applied within the space of eight time segments. Applying the 16 current sources individually allows the effects of mismatched individual current sources to be minimized by averaging the voltages that are produced across the PN junction by the mismatched individual current sources over time.

Figure 5:
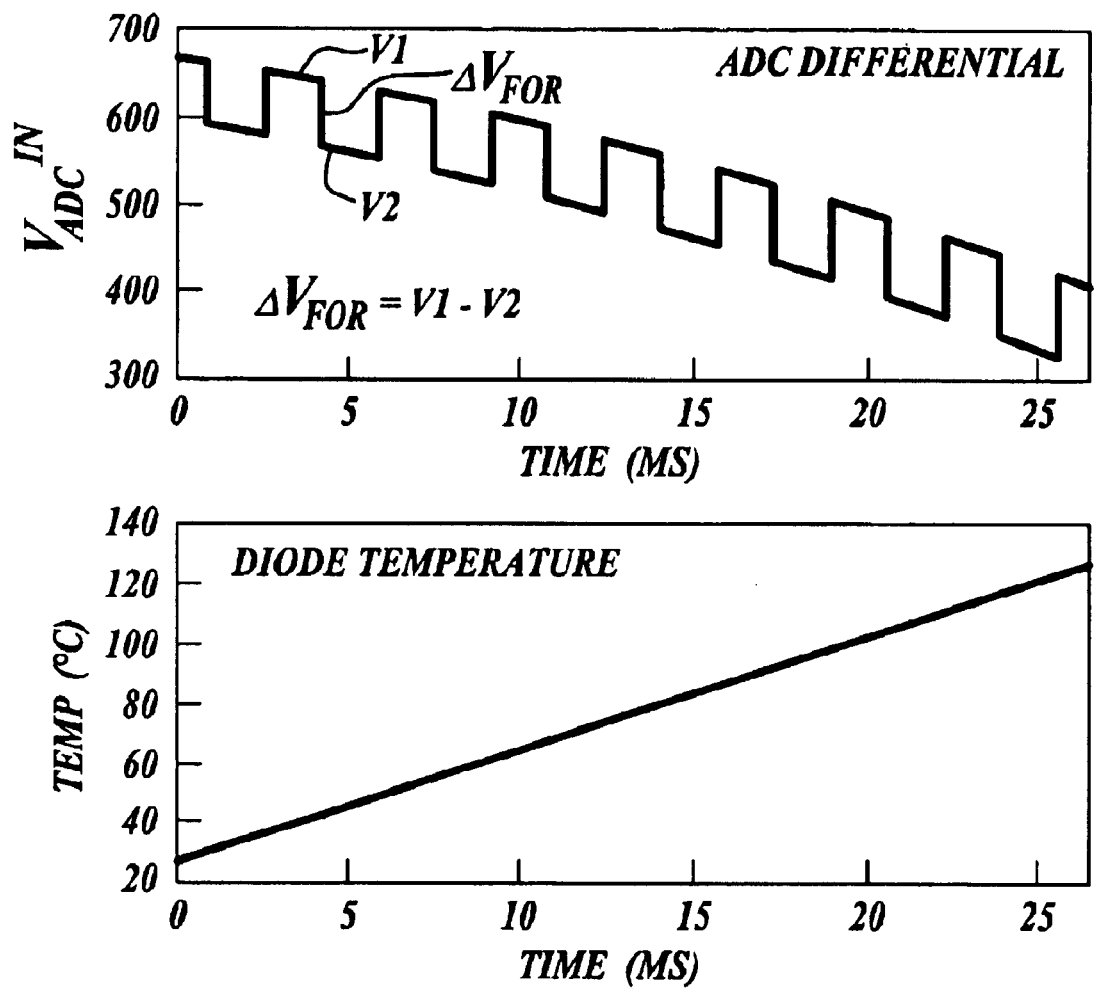
FIG. 5 is a graph illustrating an exemplary voltage produced across a PN junction in a remote sensor as a function of the temperature of the PN junction and the current density applied to the PN junction in accordance with the present invention.

FIG. 5 is a graph illustrating an exemplary voltage produced across a PN junction in a remote sensor (120) as a function of the PN junction temperature and applied current. The graph illustrates generally that the voltage produced across the PN junction in the remote sensor (120) decreases in response to a rise in PN junction temperature. The "square wave" appearance of the voltage signal produced across the PN junction in the remote sensor (120) is the result of applying alternating current densities to the PN junction. For example, a 16x current produces a higher voltage (V1), while a 1x current produces a lower voltage (V2). The combined result of the change in temperature and the alternating current densities produces a change in the height of the "square wave" (i.e. produces a change in $\Delta V_{for}$ as described above with reference to Formula 1). The ratio of applied current densities (16×, here) and the measured voltages can be used to calculate the temperature of the PN junction as previously described.

Figure 6:
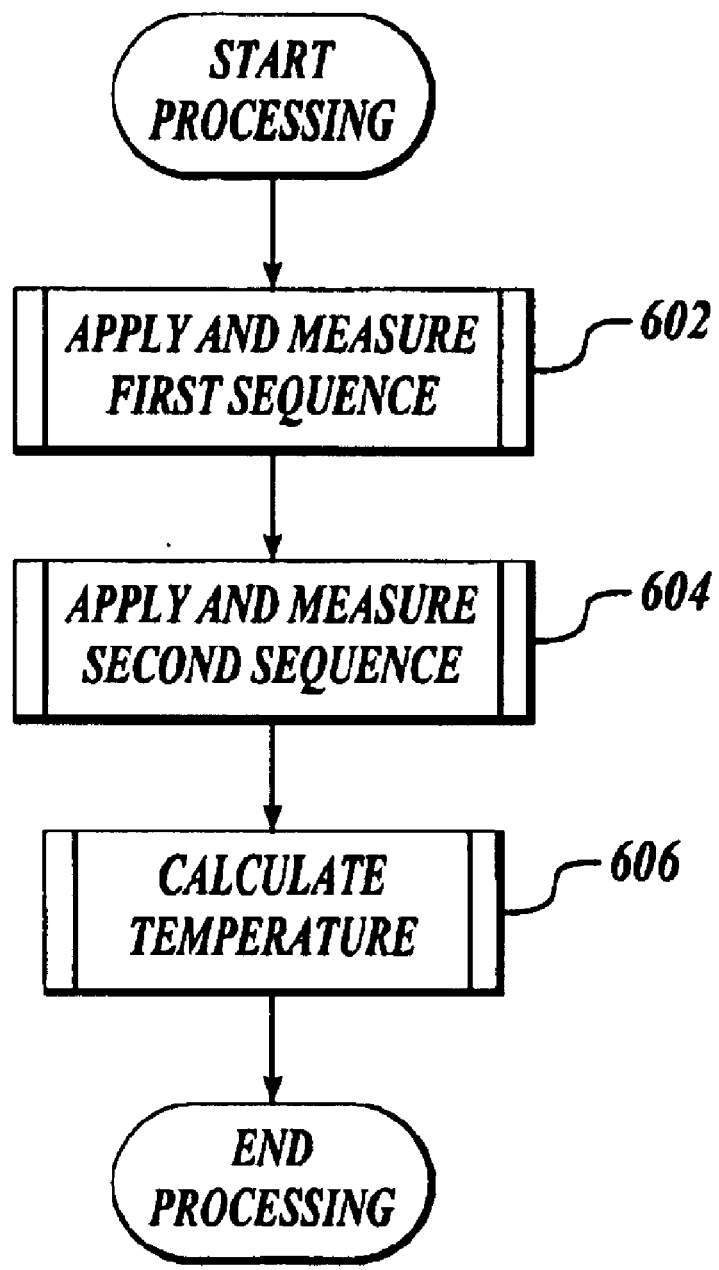
FIG. 6 is a flow diagram of an example method for time-interleaved sampling of voltages produced across a temperature-sensitive PN junction using two sequences of bias currents in accordance with the present invention.

FIG. 6 is a flow diagram of an example method for time-interleaved sampling of voltages produced across a temperature-sensitive PN junction in accordance with the present invention. Processing begins at block 602 (apply and measure first sequence) where a first sequence of bias currents is applied to the PN junction. The resulting voltages are measured across the PN junction. Processing proceeds from block 602 to block 604. In block 604 (apply and measure second sequence), a second sequence of bias currents is applied to the PN junction and the resulting voltages are measured. Processing proceeds from block 604 to block 606. In block 606 (calculate temperature), the measured resulting voltages from block 602 and block 604 are used to produce a numeric index that describes the effect of temperature upon the PN junction.

The apply and measure first sequence routine is described below with reference to FIG. 7. The apply and measure second sequence routine operates similarly to the apply and measure first sequence routine, except that the routine is used to apply a second sequence of bias currents. Optionally, the first and second sequence of bias currents may be combined such that the combination comprises a random or pseudorandom sequence of bias currents. The calculate temperature routine is described below with reference to FIG. 8.

Figure 7:
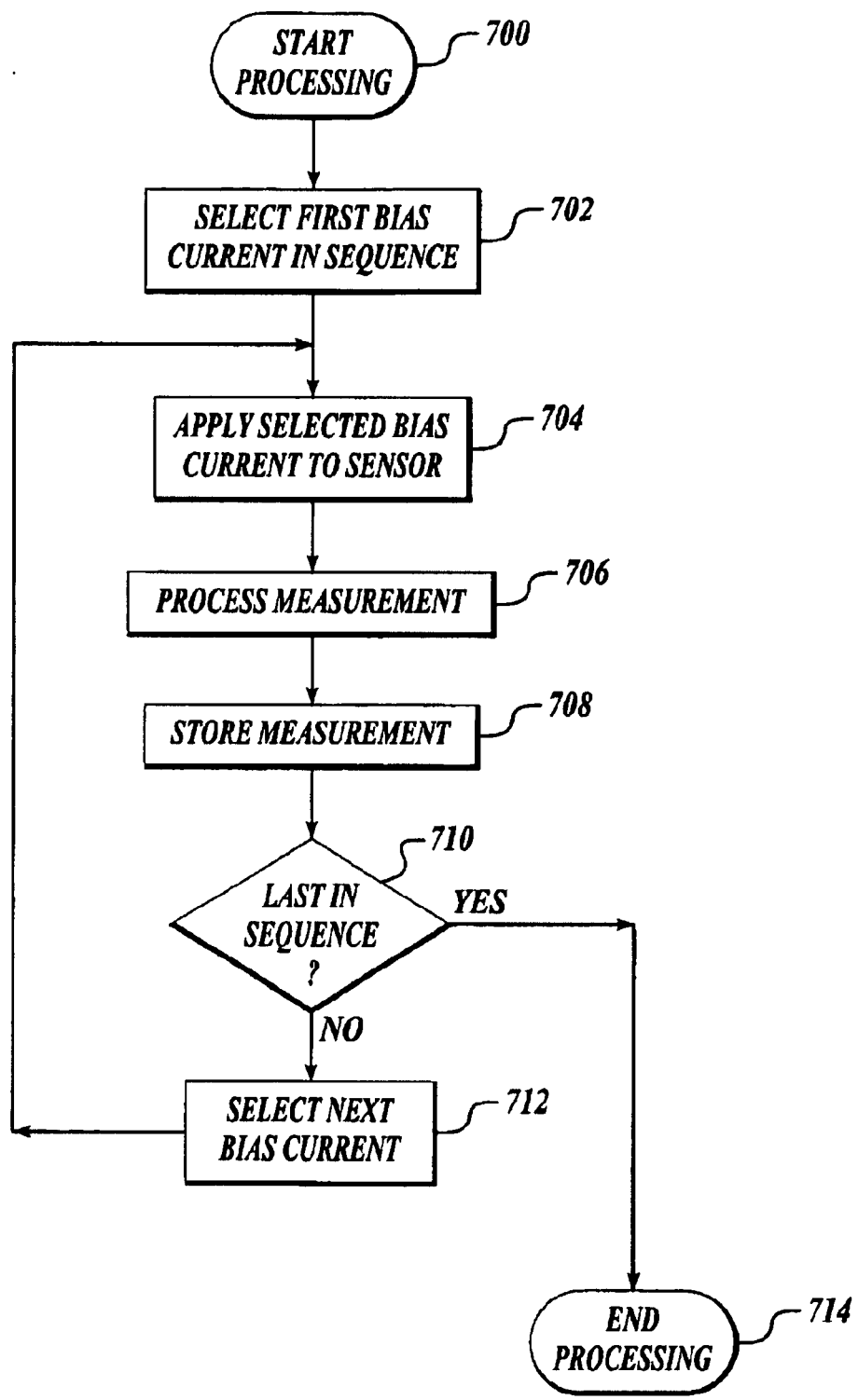
FIG. 7 is a flow diagram illustrating a method for applying a first sequence of bias currents and measuring a resulting potential on a remote sensor in accordance with the present invention.

FIG. 7 is a flow diagram illustrating a method for applying a sequence of bias currents and measuring a resulting potential on a remote sensor (120) (i.e., a PN junction). Beginning at block 702 (select first bias current in sequence), the first bias current in the sequence is selected. Processing continues at block 704 (apply selected bias current to remote sensor) where the selected current is applied to the remote sensor (120). Proceeding to block 706 (sample voltage across remote sensor), the voltage across the remote sensor (120) is sampled while the selected current is applied to the remote sensor (120). Proceeding from block 706 to block 708 (store measurement), the sample obtained from the ADC (114) is stored in the temperature log (118) or other suitable memory device. Processing continues at decision block 710 (last in sequence?), where the currently selected bias current is evaluated to determine if it is the last bias current in the sequence. When the currently selected bias current is not the last one in the sequence, processing continues to block 712. At block 712 (select next bias current), the next bias current in the sequence is selected and processing flows to block 704. Returning to decision block 710, processing flows to block 714 (END) when the last bias current in the sequence has been used. At block 714, processing is terminated.

The first and second sequences of bias currents can be processed using FIG. 7. In an example embodiment, the second sequence is the same as the first sequence, except that the second sequence is in reverse order with respect to the first sequence. Either the last bias current of the first sequence or the first bias current of the second sequence may be omitted if the last bias current of the first sequence is the same as the first of bias current of the second sequence. The results of the non-omitted bias current may be used in place of the omitted bias current for purposes of calculating the temperature of the PN junction in the remote sensor (120).

Figure 8:
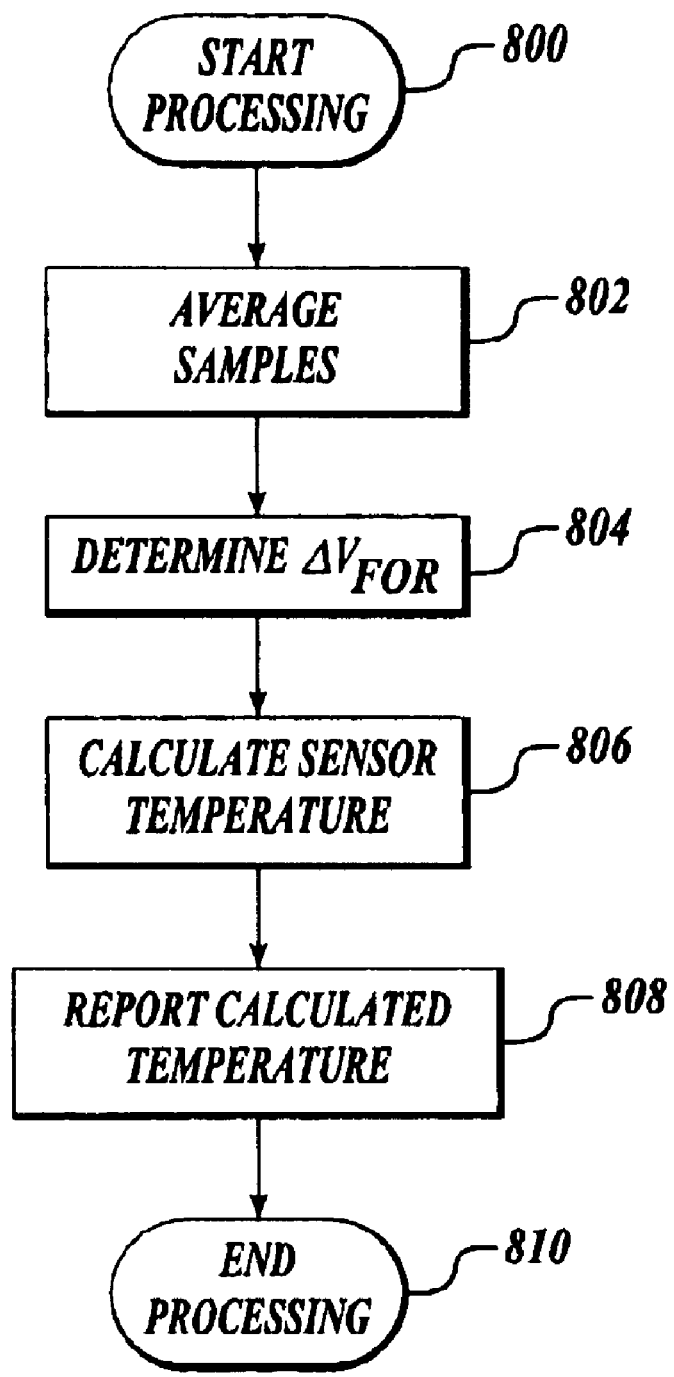
FIG. 8 is a flow diagram illustrating a method for calculating a temperature for the PN junction in a remote sensor in accordance with the present invention.

FIG. 8 is a flow diagram illustrating a method for calculating a temperature for the PN junction in a remote sensor (120) in accordance with the present invention. Beginning at block 802 (average samples), a numeric average for the samples from each bias current in a segment of time is determined. For example, all samples associated with a 16× current that were made during the period for which the temperature is to be calculated are averaged together, and all samples associated with a 1× current that were made during the period for which the temperature is to be calculated are averaged. The samples to be averaged may be samples taken during oversampling the voltage of the PN junction in the remote sensor (120). The samples to be averaged may also be samples that are made when different current sources that have the same current density are applied.

Processing continues at block 804 (determine $\Delta V_{for}$), where $\Delta V_{for}$ is calculated by subtracting the average of the samples made when applying the higher bias current from the average of the samples derived from the lower bias current. Other algebraic manipulations of the calculation are possible. For example, each $\Delta V_{for}$ can be determined by subtracting the sample derived from a lower bias current from a sample derived from an adjacent-in-time higher bias current and then the sequence of determined $\Delta V_{for}$s can be averaged to produce a single $\Delta V_{for}$.

Proceeding from block 804 to block 806 (calculate remote sensor temperature) the temperature for the PN junction in a remote sensor (120) is calculated using equation (I), described above. Certain calculations required by the formula may be calculated in advance in order to more quickly calculate temperatures at runtime. For example, factors that remain constant may be calculated in advance for later use. In another example, constant factors that merely "scale" the resulting temperature may be left out of the calculation. Additionally, lookup tables can be used to perform calculations or determine various actions to be taken.

Proceeding from block 806 to block 808 (report calculated temperature), the calculated temperature is stored in the temperature log (118) for further dissemination. The determined temperature can be used for various purposes including instrumentation, control of a process for making articles of manufacture, changing clock speeds of a processor, shutting down parts of a circuit to allow for cooling and power conservation, and the like. Proceeding from block 808 to block 810, processing is terminated.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of determining a temperature from a remote sensor, comprising:

producing a first current level;

producing a second current level that is different from the first current level;

applying a sequence of the first and second current levels to the remote sensor circuit wherein the sequence is selected from a random sequence, a pseudorandom sequence, and an ordered sequence that comprises applying the first current level at a first and a last time and applying the second current level at a second and a next-to-last time;

measuring first voltages from the remote sensor circuit when the first current level is applied;

measuring second voltages from the remote sensor circuit when the second current level is applied;

determining a temperature value from the first and second measured voltages.

2. The method of claim 1, wherein the temperature value is calculated by:
   determining a first average using the first measured voltages;
   determining a second average using the second measured voltages; and
   using the first and second averages to calculate the temperature value.

3. The method of claim 1, wherein the temperature value is calculated by:
   determine a first difference between the first and second measured voltages when the first current level is applied followed by the application of the second current level;
   determining a second difference between the first and second measured voltages that occur upon the change from applying a second current level to applying a first current level; and
   calculating the temperature value from the first and second differences.

4. The method of claim 1, wherein the method for applying the sequence of the first and second current levels further comprises applying a third current level to a remote sensor circuit and wherein the step of determining the temperature value further comprises determining the temperature value from the third current level.

5. The method of claim 1, further comprising applying the sequence to the remote sensor circuit at a second time, wherein a second current source is used at the second time to apply a current for the lesser of the first and second current levels, wherein the second current source is different from a first current source that is used at the first time to apply a current for the lesser of the first and second current levels.

6. A system of determining a temperature from a remote sensor, comprising:
   means for producing a first current level;
   means for producing a second current level that is different from the first current level;
   means for applying a sequence of the first and second current levels to the remote sensor circuit, wherein the sequence is selected from a random sequence, a pseudorandom sequence, and an ordered sequence that comprises applying the first current level at a first and a last time and applying the second current level at a second and a next-to-last time;
   means for measuring first voltages from the remote sensor circuit when the first current level is applied;
   means for measuring second voltages from the remote sensor circuit when the second current level is applied;
   means for determining a temperature value from the first and second measured voltages.

7. The system of claim 6, wherein the temperature value is calculated by:
   means for determining a first average using the first measured voltages;
   means for determining a second average using the second measured voltages; and
   means for using the first and second averages to calculate the temperature value.

8. The system of claim 6, wherein the temperature value is calculated by:
   means for determining a first difference between the first and second measured voltages when the first current level applied is followed by the application of the second current level;
   means for determining a second difference between the first and second measured voltages that occur upon the change from applying a second current level to applying a first current level; and
   means for calculating the temperature value from the first and second differences.

9. The system of claim 6, wherein the means for applying the sequence of the first and second current levels further comprises means for applying a third current level to a remote sensor circuit and wherein the means for determining the temperature value further comprises means for determining the temperature value from the third current level.

10. A system for determining temperature from a remote sensor circuit that includes a PN junction, comprising:
    a programmable current source that is coupled to the remote sensor circuit such that the programmable current circuit provides a bias current to the PN junction when activated, wherein the bias current has an associated level that is selected from at least a first current level and a second current level;
    a controller configured to selectively apply:
       a first control signal to the programmable current source at a first time such that the associated level of the bias current at the first time corresponds to the first current level;
       a second control signal to the programmable current source at a second time such that the associated level of the bias current at the second time corresponds to the second current level;
       a third control signal to the programmable current source at a third time such that the associated level of the bias current at the third time corresponds to the second current level; and
       a fourth control signal to the programmable current source at a fourth time such that the associated level of the bias current at the fourth time corresponds to the first current level;
    a converter that includes an input that is coupled to the remote sensor circuit, and an output that is configured to provide voltage values that correspond to a voltage across the PN junction at the first, second, third, and fourth times; and
    a processor that is coupled to the output of the converter, wherein the processor calculates a temperature value in response to the voltage values that are produced at the first, second, third, and fourth times.

11. The system of claim 10, the programmable current circuit further comprising a first current source that is arranged to selectively produce the first current level and a second current source that is arranged to selectively produce the second current level.

12. The system of claim 10, wherein the first current level and the second current level are related to one another by a ratio having a value that is greater than one.

13. The system of claim 10, wherein the converter is configured to oversample the voltage across the PN junction at the first, second, third, and fourth times such that a multiplicity of output codes are produced for each of the first, second, third, and fourth times.

14. The system of claim 10, further comprising:
    a first difference between the first and second times;
    a second difference between the second and third times; and
    a third difference between the third and fourth times such that each of the first, second, and third difference is substantially equal to one another.

15. The system of claim 10, the processor comprising:

a first average calculator that is arranged to provide a first temperature average in response to the voltage values from the first and fourth times;

a second average calculator that is arranged to provide a second temperature average in response to the voltage values from the second and third times; and a temperature calculator that is arranged to calculate the temperature value in response to the first and second temperature averages.

16. The temperature sampling system of claim 15, the first average calculator further comprising:

an adder that is arranged to provide a sum of the voltage values from the first and fourth times; and a divider that is arranged to provide the temperature value by dividing the sum of the voltage values by a factor equal to the number of the voltage values from the first and fourth times.

17. The temperature sampling system of claim 10, the processor further comprising:

a first subtracter that is arranged to provide a first difference in response to the voltage values from the first and second times;

a first temperature calculator that is arranged to provide a first initial temperature in response to the first difference;

a second subtracter that is arranged to provide a second difference in response to the voltage values from the third and fourth times;

a second temperature calculator that is arranged to receive the second difference as an input and provides a second initial temperature as an output in response to the second difference; and an average calculator that is arranged to calculate the temperature value in response to the first and second initial temperatures.

18. The system of claim 17, the average calculator fixer comprising:

an adder that is arranged to provide a sum of the first and second initial temperatures; and a divider that is arranged to provide the temperature value by dividing the sum of the first and second initial temperatures by a factor of two.

19. The system of claim 10, the programmable current circuit further comprising a plurality of current sources that are configured to selectively produce the first and second current levels.

20. The system of claim 19, wherein a selected one of the plurality of current sources is selected for the first current level and the second current level.

21. The system of claim 19, where the programmable current circuit is configured to selectively enable one of the plurality of current sources to produce the first current level, and also configured to selectively enable all of the plurality of current sources to produce the second current level.

22. The system of claim 21, wherein the programmable current circuit is arranged to enable each of the plurality of current sources at different times.

\* \* \* \* \*

UNITED STATES PATENT AND TRADEMARK OFFICE
CERTIFICATE OF CORRECTION

PATENT NO.    : 6,808,307 B1
DATED         : October 26, 2004
INVENTOR(S)   : Mehmet Aslan et al.

It is certified that error appears in the above-identified patent and that said Letters Patent is hereby corrected as shown below:

Column 2,
Line 39, change "The a programmable" to -- The programmable --.

Column 3,
Line 35, change "arc" to -- are --.

Column 9,
Line 13, change "determine" to -- determining --.

Column 12,
Line 8, change "fixer" to -- further --.

Signed and Sealed this

Fourteenth Day of June, 2005

JON W. DUDAS
*Director of the United States Patent and Trademark Office*